United States Patent

[11] 3,610,406

[72] Inventors Fred J. Fleischauer
Pittsburgh;
John D'Amore, Butler; Ralph C. Green,
Butler, all of Pa.
[21] Appl. No. 714,625
[22] Filed Mar. 20, 1968
[45] Patented Oct. 5, 1971
[73] Assignee General Logistics Corporation
Oakmont, Pa.

[54] CONVEYOR CONSTRUCTIONS AND TORQUE-LIMITING TRANSMISSIONS THEREFOR
11 Claims, 31 Drawing Figs.

[52] U.S. Cl. .............................................. 198/127,
193/35 A
[51] Int. Cl. .............................................. B65g 13/02
[50] Field of Search .................................... 193/35, 35
A, 37; 198/41, 127, 183; 64/28, 30 M

[56] References Cited
UNITED STATES PATENTS

| | | | |
|---|---|---|---|
| 1,812,976 | 7/1931 | Nistle | 198/127 |
| 3,164,246 | 1/1965 | Good | 198/160 |
| 3,235,047 | 2/1966 | Weiss | 64/30 M |
| 3,252,302 | 5/1966 | Beers | 64/28 |
| 3,327,837 | 6/1967 | Covell | 198/127 |

FOREIGN PATENTS
439,093  12/1967  Switzerland .................. 193/35 A

*Primary Examiner*—Andres H. Nielsen
*Attorney*—Buell, Blenko & Ziesenheim

ABSTRACT: A number of limited torque conveyor constructions are disclosed, which are suitable for a variety of uses. Each roller of the conveyor, or at least in that portion thereof where accumulation may occur, is coupled to a torque-limiting transmission such that the rollers are not rotated when in contact with articles stopped upon the conveyor. By thus limiting the driving torques applied to the conveyor rollers, damage-producing forces cannot build up in a line of stopped or accumulated articles. When arranged for accumulation, the disclosed conveyors apply only that torque which is necessary to overcome the rolling friction of the loaded conveyor rollers. The summation of the tangential forces acting upon accumulated or stopped articles is very small in comparison to the forces developed by positively driven or live conventional rollers which continue to rotate while contacting stopped articles. The invention also contemplates a number of forms of torque-limiting transmissions. Singulation devices are disclosed in combination with the torque-limiting feature. A conveyor construction suitable for use partially within a sealed enclosure also is disclosed.

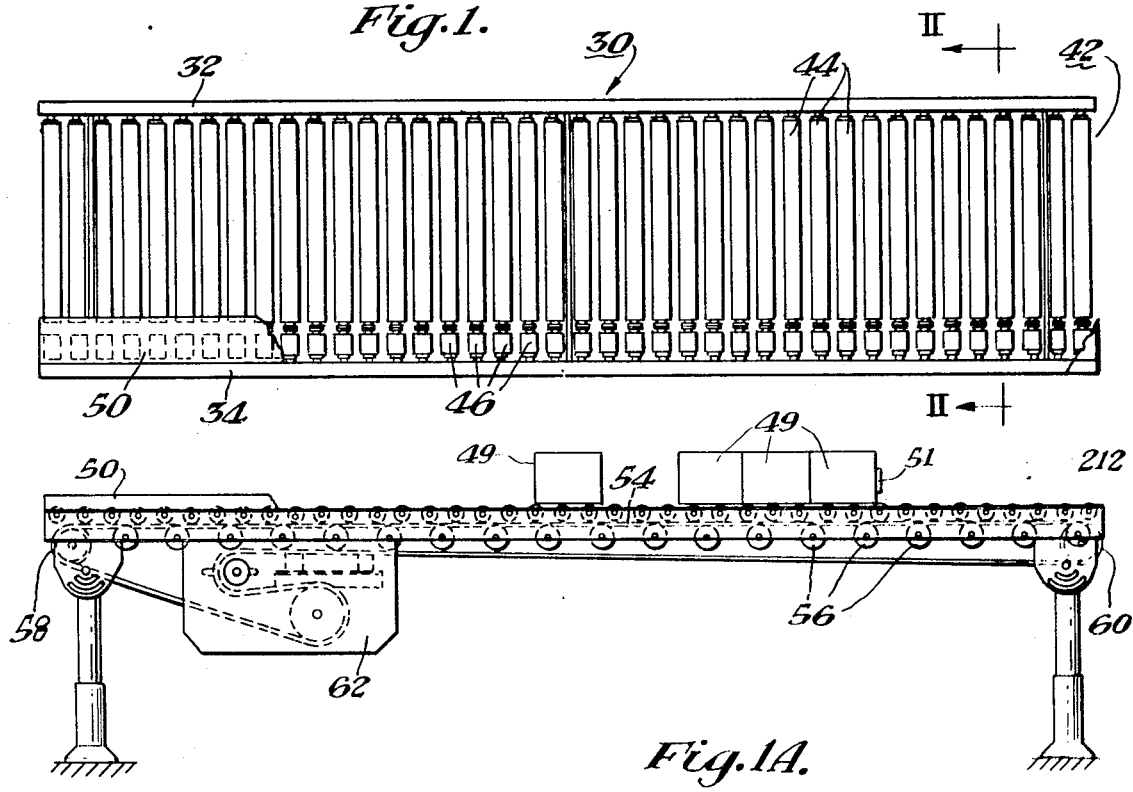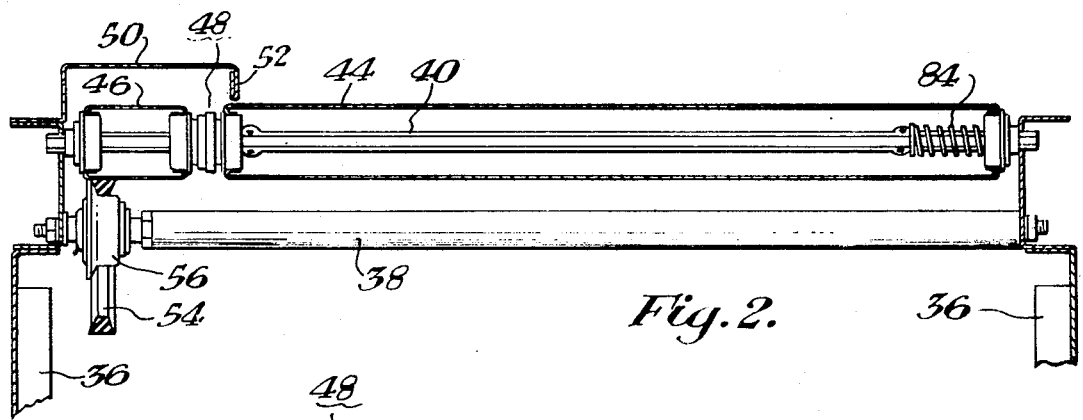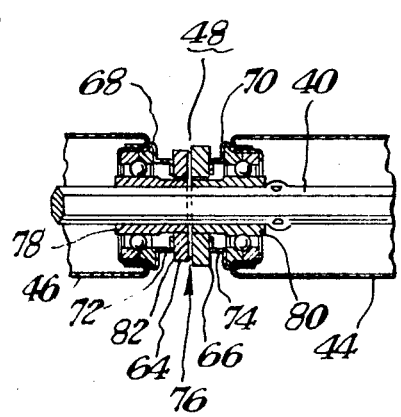

INVENTORS
Fred J. Fleischauer, John D'Amore
and Ralph Green.,
BY Buell Blenko & Ziesenheim
THEIR ATTORNEYS INVENTORS
Fred J. Fleischauer, John D'Amore
and Ralph Green.
BY Buell Blenko & Ziesenheim
THEIR ATTORNEYS

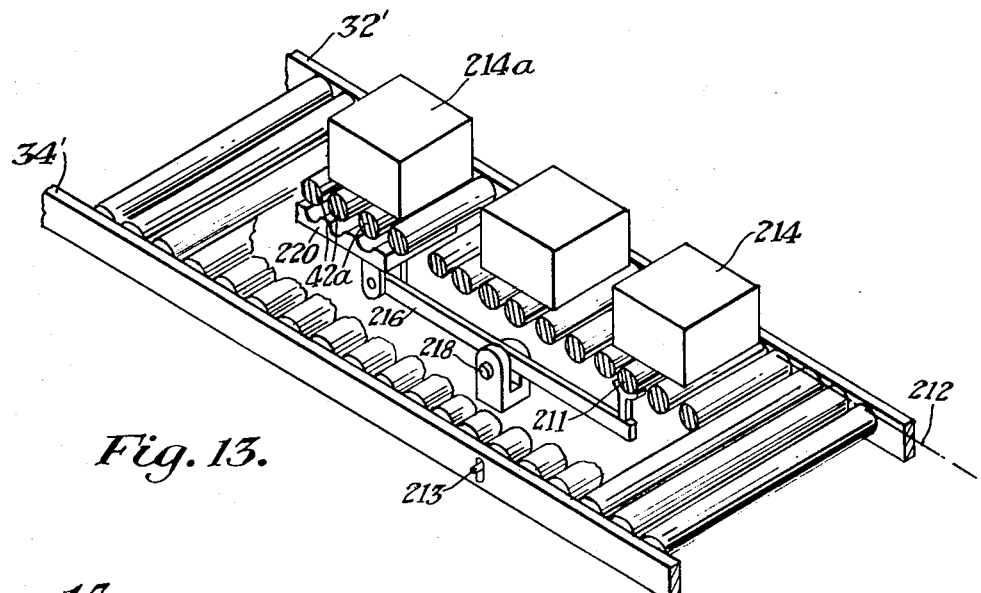
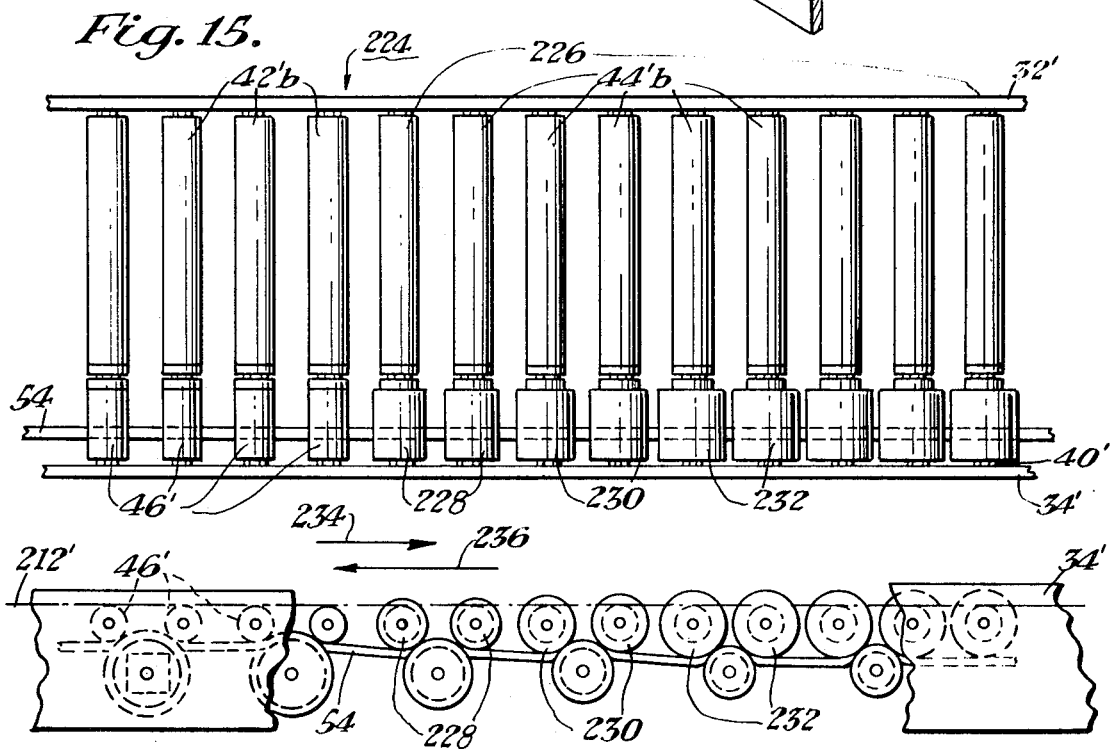
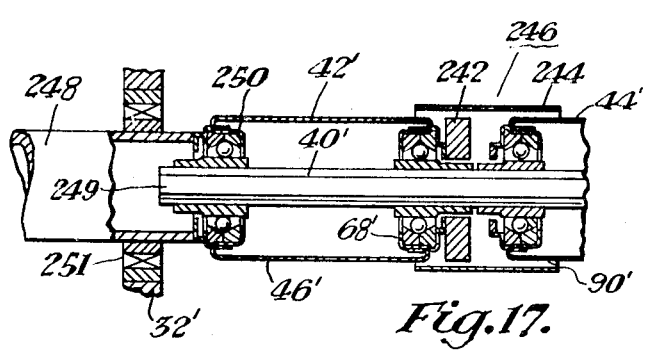

CONVEYOR CONSTRUCTIONS AND TORQUE-LIMITING TRANSMISSIONS THEREFOR

Our present invention relates to conveyor constructions suitable or many applications and various types of installations including inclined and accumulation conveyors, and more particularly to torque-limiting transmissions adapted particularly for use in combination with our novel conveyor constructions but capable of general usage as well. In our accumulation conveyors the torque-limiting transmission considerably reduces power requirements during those times when articles are accumulated upon the conveyor.

Because of the difficulties involved with the construction and use of accumulation conveyors, our invention will be described primarily in this applicative background. It will be apparent however that our invention has other uses, some of which will be mentioned below.

In recent years various types of accumulation conveyors have been developed to solve the increasingly serious problems of providing surge capacities in modern production lines or in other article handling or packaging systems. Although conventional accumulation conveyors perform the accumulating function with a moderate degree of success, their application has been limited by excessive power requirements in the case of heavier articles and the possibilities of damage to lighter or more fragile articles, when accumulated thereon. The difficulties of installing and maintaining conventional accumulation conveyors with their high torque requirements, in addition limit the capacity and availability of these conveyors for many applications.

Many existing accumulation conveyors include live or positively driven rollers with some form of mechanism to decouple the belt or other drive mechanism from those rollers beneath an article which is stopped on a conveyor line. The decoupling mechanisms are not only expensive but are often unduly complicated and, therefore in many cases, unreliable. In other known accumulation conveyor designs various types of clutch arrangements are employed to permit slippage of the drive mechanism at the rollers beneath a stopped article on the conveyor. For example, Covell U.S. Pat. No. 3,327,837 discloses a frictional clutch arrangement for some of the conveyor rollers. In addition to being subjected to considerable wear, the frictional clutch is not employed in conjunction with all of the conveyor rollers. Fix U.S. Pat. No. 3,285,381 also shows an accumulation conveyor wherein springs are unwound from portions of the power rolls to permit slippage between the power rolls and the drive rolls. The slippage is controlled by a yoke arrangement. Here again the elements of the slip clutch are subjected to unusual wearing forces. Moreover, the Fix conveyor utilizes a complicated driving arrangement wherein driven rollers are rotated by power rolls. The latter rolls are clutched as aforedescribed to the drive rolls. In the last examples, all of the rollers must be clutched or declutched simultaneously. It is not possible to accumulate articles on one portion of the conveyor and run off the articles on the remainder of the conveyor.

Because of the several disadvantages involved in the construction of an accumulation conveyor with slip clutch live rollers, many conventional accumulation conveyors simply force the live rollers to continue turning beneath the stopped articles. The continued rotation of the rollers naturally entails considerable friction and power consumption, in addition to scuffing of the articles and wearing of the rollers.

When a row of articles has been accumulated upon such conveyor, the frictional forces on each article is transmitted to the articles downstream of it in the accumulated line. Thus, the total force acting upon any one article in the line is the force acting upon it plus the summation of the forces acting upon all of the accumulated articles upstream of such given article. The purpose of a properly designed accumulation conveyor is to prevent excessive force buildup in this manner which may damage at least those articles adjacent the head (downstream end) of the line. At the same time it is essential that the accumulation conveyor be able to restart the accumulated articles immediately when required.

These disadvantages have, of course, limited the length of the line of articles which can be accumulated upon a conveyor. The length of conventional accumulation conveyors is also limited by the power requirements which are dictated not by the requirement for the orderly progression of articles along the conveyor but rather by the much greater power requirements necessary to drive live rollers (or similar transfer mechanism) when contacting the stopped or accumulated articles. Therefore, the normally very small power requirement for driving individual live rollers when in contact with moving articles, has of necessity been ignored in the design of conventional accumulation conveyors. Instead, the drive mechanism for such conventional conveyors has been designed to supply the much greater frictional torques necessary to drive the live rollers when slipping against the surfaces of accumulated articles.

To illustrate the differences in torque requirements, one may consider a $F/N 100$ pound article or package resting upon three rollers of a conventional live roller accumulation conveyor, with each of the rollers being 2 inches in diameter. The rollers are equipped with ball bearings and are driven by individual engagement with a drive belt. As the rollers are driven at a constant speed and the article moves forward at a constant speed, the only driving force required is that for overcoming the loaded rolling or bearing friction in the rollers. The coefficient of rolling friction ($f_1$) or the ratio of tangential or rolling force ($F$) at the roller surface to the normal force ($N$) on the roller is usually less than 0.01. Thus:

$$F/N = f_1 = 0.01$$

Each roller then will require a rolling force ($F$) of:

$$F = 0.01 N = 0.01 \times 100/3 = 0.333 \text{ lb.}$$

The individual roller driving torque (T) required is:

$$T = Fr = 0.333 \text{ lb.} \times 1 \text{ in.} = 0.33 \text{ in.-lb.}$$

where $r$ = roller radius.

When the article is stopped or accumulated on the conveyor, in the example set forth above, the assumed three rollers slip beneath but in contact with the article. The much greater driving torque (T) then required depends upon the coefficient of sliding friction ($f_2$) between the article and the rollers. A common value of ($f_2$) is 0.2, and the force at the roller surface during slipping contact is:

$$F = f_2 N \text{ or } F/N = 0.2$$

For each roller:

$$F = 0.2 \times 100/3 = 6.66 \text{ lb.}$$

The roller torque becomes:

$$F = Fr = 6.6 \times 1 = 6.66 \text{ in.-lb.}$$

From the foregoing example it will be seen that the ratio of accumulated article torque to moving article torque per roller is significantly large and of the order of 20/1.

A basic solution to this problem of preventing excessive pressure buildup in a line of accumulated articles is to drive each roller of the accumulation conveyor such that the drive torque is limited to the range necessary to move the articles, i.e., the very small torque limited substantially to overcoming the loaded rolling friction of the rollers. Then the tremendous frictional forces of conventional live roller conveyors are obviated, as the stopping of articles upon the conveyor likewise stops the motion of supporting rollers. If this desirable result can be realized the pressures of accumulation will then be only about one-twentieth of that produced by conventional positively driven live rollers, where the rollers slip in contact with stopped articles. Alternatively, a line of accumulated articles can be about 20 times as long as that permissible with conventional live roller conveyors used for accumulation.

We overcome these disadvantages of the prior art by providing novel conveyor constructions and the like wherein each otherwise live roller assembly thereof incorporates a torque-limiting transmission coupled to the conveyor roller drive mechanism. The transmission permits only a predetermined maximum torque to be applied to each roller of the conveyor. When this torque requirement is exceeded the rollers merely stop rather than slip beneath accumulated articles. Our novel conveyor is arranged such that the conveyed articles cannot engage positively driven components of the drive mechanism. As a result the only forces applied to the articles when accumulated are the aforementioned very small torques necessary to overcome frictional forces and inertia of stopped rollers and articles. In certain forms of our conveyor, we provide additional novel means for removing even these small forces from the stopped or accumulated articles, as in the case of very long conveyors, for example. The accumulated articles, however, are readily restarted by the very small torque transmitted to the individual rollers coupled to the transmissions.

We are aware, of course, that there are known forms of torque-limiting transmissions. Conventional magnetic couplings, for example, are usually arranged to transmit maximum torques within their capabilities. For example, Beers U.S. Pat. No. 3,252,302 disclosed a magnetic universal coupling utilizing identical ring couplings. Wood U.S. Pat. No. 2,437,871 shows a magnetic clutch utilizing interfitting cylindrical magnets. Hoad U.S. Pat. No. 2,746,691 describes a magnetic coupling for a photographic film pickup mechanism and having magnets loosely mounted in openings in a drive torque. A second magnetic coupling links the reel hub with an annular member. However, these references do not teach the limiting of drive torques applied respectively and individually to the many rollers of a conveyor construction, such as we have disclosed herein, to essentially that necessary to overcome inertial and rolling frictional forces. Moreover, none of the references mentioned herein shows how to incorporate a magnetic coupling of any kind with driving and driven components of a live roller assembly for use in such conveyor. In our conveyor constructions, various types of torque-limiting transmissions are useful. Magnetic transmissions, for example, are inclusive of magnetic synchronous drives, eddy current drives, magnetic hysteresis drives, and magnetic frictional drives, all of which are described in greater detail below. Equivalent mechanical torque-limiting transmissions will occur to those skilled in the art.

In certain applications it is desirable that accumulated articles on a conveyor be spaced to facilitate subsequent handling or to prevent damaging contact between the articles. In most if not all previous accumulator conveyor designs the articles, in order to be accumulated, must contact a preceding accumulated article before it is stopped. Thus, the accumulated line of articles must absorb the kinetic energy from the oncoming articles. Fragile articles which may be broken by these forces, therefore, do not lend themselves to accumulation upon conventional conveyors. When the accumulated line of articles is restarted, delivery of articles in spaced array is frequently desirable. For these applications, we desirably provide novel singulation means in cooperation with the torque-limiting feature of our conveyor constructions. Certain forms of our singulation devices can be employed also for desingulation, depending upon the direction of article movement on the conveyor, to close gaps between articles.

It will become apparent as this description proceeds that certain forms of our novel torque-limiting transmissions can be employed in a negative fashion, for example in an inclined or dead roller conveyor. A common problem encountered in the use of inclined roller conveyors is inclination at steep angles owing to space limitations in the building or other structure in which the conveyor is used. It is then difficult to prevent damage to more fragile conveyed articles at the bottom end of the conveyor. An attendant problem is related to the inertia of the dead rollers, which are often mounted on ball bearings or the like. The inclination of the conveyor must be selected such that the first article down the conveyor will overcome the inertia of the then stationary rollers. After the rollers have commenced turning, however, subsequent articles may travel much too fast down the conveyor resulting in article damage. Another feature of out invention, then, is the provision of means for applying drag forces to the rollers when rotating, but which do not interfere with starting up the rollers by the first article sent down the conveyor.

We accomplish these desirable results by providing a conveyor construction comprising a pair of elongated spaced supports and mounting means therefor, a plurality of spaced axles extending transversely between said supports and mounted thereon adjacent their ends respectively, a driven roller rotatably mounted on each of said axles, and a torque-limiting transmission mounted adjacent each of said axles for applying a predetermined maximum torque to the associated one of said rollers.

We also desirably provide a similar conveyor wherein driving means are coupled to each of said torque-limiting transmissions for actuating the same.

We also desirably provide a similar conveyor wherein said driving means include a driving roller rotatably mounted on each of said axles adjacent the associated one of said driven rollers for relative rotation with respect thereto, and said torque-limiting transmissions are coupled respectively between the driving and driven rollers of each axle.

We also desirably provide a similar conveyor wherein a guard member is secured to an adjacent one of said supports and overlies said driving rollers to prevent articles conveyed by said conveyor from contacting said driving rollers.

We also desirably provide a similar conveyor wherein each of said torque-limiting transmissions includes a magnetic slippage coupling and said drive means are capable of rotating said driving rollers at relatively high differential speeds with respect to the speed of the associated driven rollers.

We also desirably provide a similar conveyor wherein singulation means are coupled to said conveyor for varying the speed of some of said driven rollers relative to the remainder thereof in order to change the spacing between adjacent articles carried by said conveyor structure.

We also desirably provide a similar conveyor wherein each of said torque-limiting transmissions includes means movable longitudinally of the associated axle for decoupling said transmission and means are mounted adjacent each of said axles for engaging said decoupling means and returning said decoupling means to their torque-transmitting positions.

We also desirably provide a torque-limiting magnet transmission for applying a predetermined torque between driving and driven members tandemly and rotatably mounted upon a common axle, said transmission including a permanent magnet secured to at least one of the juxtaposed ends of said members for rotation therewith and disposed for magnetic interaction with the other of said juxtaposed member ends, and means mounted on said axle for spacing said members one from the other.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein:

FIG. 1 is a top plan view of one form of conveyor construction arranged in accordance with our invention;

FIG. 1A is an elevational view of the conveyor shown in FIG. 1;

FIG. 2 is an enlarged cross-sectional view of the conveyor as shown in FIG. 1A and taken along reference line II—II thereof;

FIGS. 2A, 2B and 2C show modified forms of our novel torque-limiting transmission;

FIG. 13 is a partial isometric view of another form of our novel conveyor construction having means associated therewith for inducing singulation of articles carried thereby;

FIG. 14 is a partial side elevational view of a conveyor construction having a modified form of singulation means which can be employed also for desingulation purposes depending upon the direction of movement of articles upon the conveyor;

FIG. 15 is a top plan view of the apparatus as shown in FIG. 14;

FIG. 17 is an enlarged partial cross-sectional view of the apparatus shown in FIG. 16 and taken along reference line XVII—XVII thereof;

Figure 2A:
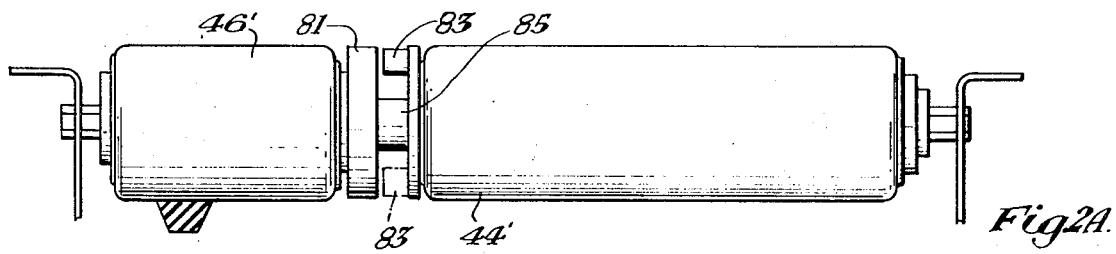
Figure 2B:
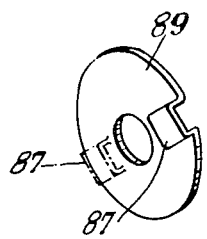

Referring now to FIGS. 1, 1A and 2 of the drawings, the exemplary form of our novel accumulation conveyor 30 shown therein comprises a pair of side rails 32, 34 each of which is supported upon two or more legs 36. The rails 32, 34 are spacedly joined by convenient means such as a plurality of cross braces 38 (FIG. 2). As better shown in the latter figure a plurality of axles 40 are suspended between the rails 32, 34. In this arrangement the axles 40 are keyingly inserted into suitably shaped apertures in the rails 32, 34 such that the axles 40 are nonrotatably mounted therebetween. In this example, the axles 40 are of hexagonal configuration along their length, although some other form may be employed.

A roller assembly denoted generally by the reference character 42 is rotatably mounted upon each of the axles 40. In this example, each roller assembly 42 includes an elongated driven roller section 44 and a relatively short driving roller section 46. Each of the roller sections 44, 46 are substantially independently and rotatably mounted upon the associated axle 40.

A torque-limiting transmission denoted generally by reference character 48 is coupled between each driving roller section 46 and the associated driven roller section 44. The transmission 48 is arranged in accordance with one feature of the invention to limit the torque transferred from the driving roller sections 46 respectively to the driven roller sections 44 to that force which is essentially only to overcome the rolling frictional forces of the driven rollers 44 when loaded by moving articles. It is contemplated that the forces transmitted can be adjusted depending upon the weights of various types of articles. With this arrangement when a line of articles such as articles 49 are stopped or accumulated upon the conveyor 30 (as by engaging stop bar 51) the only forces imparted thereto are the very small torque forces necessary to overcome the rolling friction and inertia of the rollers and inertia of the rollers and articles 49 stopped thereon. I have found that these forces are substantially constant although the driven rollers 44 are stopped by the stopped articles thereon, irrespective of the weight of the articles 49. In a described embodiment of our novel accumulation conveyor, additional means are disclosed for removing even these small forces from the stopped articles.

As articles are moved along the length of the conveyor 30, they are prevented from contacting the driving roller sections 46 in accordance with another novel feature of our invention. In furtherance of this purpose a guard 50 is secured to the conveyor rail 34 adjacent the drive rolls 46 and preferably extends the length of the rail as better shown in FIG. 1. In this arrangement the guard 50 is of generally inverted channel construction having a depending flange 52 or the like which closely approaches the adjacent ends of the driven roller sections 44. The depending end 52 thus prevents articles from overhanging the adjacent ends of the driven roller sections 44 and thereupon engaging the positively rotated, driving roller sections 46. The guard 50 serves also as a dust shield for preventing foreign material from contacting the transmission 48. Alternatively, the guard 50 can be omitted and the driving roller sections 46 can be made with a smaller diameter than the driven roller sections 44 to avoid contact with stopped or moving articles supported on the conveyor 30 and overhanging the adjacent ends of the driven rollers 44.

The driving rollers 46 are rotated by their engagement with an endless belt 54, the upper run of which is urged against the driving rollers 46 by a plurality of snub rollers 56. The returns of the belt are defined by sheaves 58 and 60, and the belt is driven by a conventional belt drive mechanism denoted generally by reference character 62. In this arrangement a single snub roller 56 is employed for a pair of adjacent driving rollers 46, as better shown in FIG. 1A. The upper run of the belt 54 therefore frictionally engages the undersurfaces of the driving rollers 46.

In this arrangement of the invention, the torque-limiting transmission 48 includes a pair of annular permanent magnets 64, 66 which are secured respectively to the adjacent outer bearing races 68, 70 of the driving and driven rollers 46, 44. For example, the magnets 64, 66 are secured to annular brackets 72, 74 by means of epoxy cement or the like and the brackets 74, 72 in turn are rolled upon the outer bearing races as better shown in FIG. 2C.

Each of the magnets 64 or 66 can be fabricated from a ceramic magnetic material, such as ceramagnet, strontium ferrite, and the like, with a single North pole and a single South pole or alternatively with multiple poles, depending upon the desired amount of torque to be transmitted. Other suitable permanent magnetic materials and structures such as carbon steel can be used as set forth below.

A magnetic gap 76 preferably is left between the magnets 64, 66 to prevent wearing engagement of the magnets. The width of the gaps 76 is determined by the abutting engagement of the inner bearing races 78, 80 which are nonrotatably keyed to the axle 40. The width of the gap can be further determined or adjusted by the placing of a washer 82 of given thickness between the abutting edges of the inner races 78, 80. To maintain a constant gap 76 when the width thereof is thus determined, the inner bearing races 78, 80 are continuously urged together through the use of a relatively light biasing spring 84. The spring 84 also permits easy withdrawal of the roller assembly 42 in the conventional manner.

In operation, when moving articles are conveyed along the conveyor 30, the driven roller sections 44 rotate substantially in synchronism with the driving roller sections 46. However, when one or more of the articles are stopped or accumulated upon the conveyor 30, those driven roller sections 44 in contact with the articles are likewise stopped, since the torque which would be required to rotate the driven roller sections 44 is over 20 times that required to overcome the loaded rolling friction of the driven rollers 44, as shown above. Thus, the torque-limiting transmission 48 slips in a pulsating fashion until the articles again are permitted to move. As set forth below, in other forms of our novel conveyor construction, other novel means are provided for automatically removing even the very small torques thus transmitted when the rollers 44 are stopped. Our novel torque-limiting transmissions in the latter case apply no force to the line of stopped articles, when particularly fragile articles are being handled.

The aforementioned magnetic transmission can comprise a face polarized disc magnet 81 secured to one of each pair of rollers 44', 46' and one or more magnetizable slugs 83 secured to the other roller. A tubular spacer 85 can be used between the rollers 44', 46' to maintain a predetermined magnetic gap. The slug 83 can be secured in any conventional manner eccentrically of the juxtaposed roller surfaces. Alternatively, the slug or slugs 83 can be replaced with deformed surfaces 87 of a steel washer 89 secured to the associated roller 44' or 46'.

Figure 3:
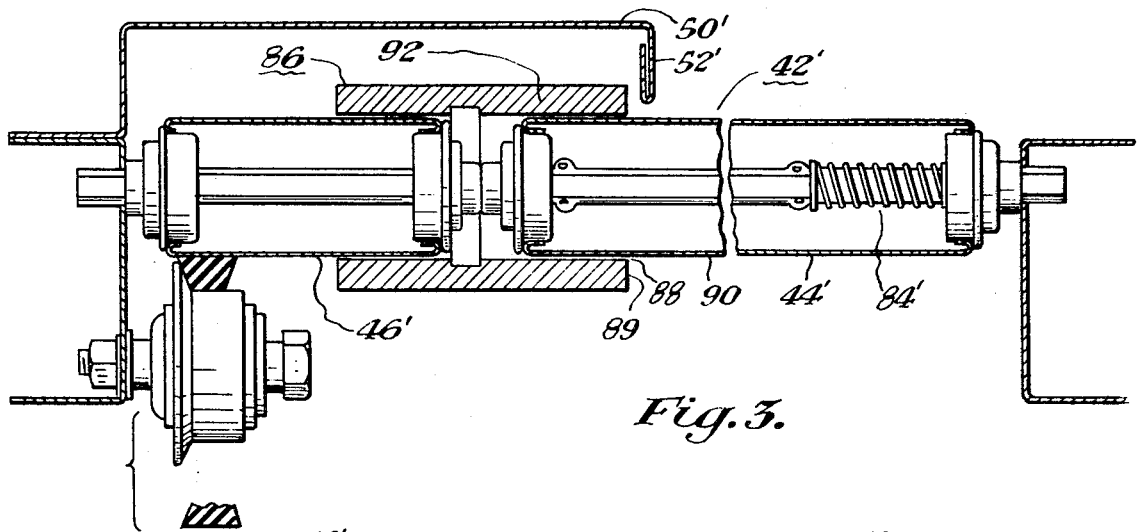
FIG. 3 is a similar view but showing another modified construction of the torque-limiting transmission.

Another form of our torque transmitting mechanism is illustrated in FIG. 3 of the drawings wherein a tubular magnet 86 is secured to the driving roller 46', for example, by shrink-fitting or by a suitable cement. The other end portion of the magnet 86 is spaced closely from the driven roller 44' to form a magnetic gap 88 therebetween. In this example, the outer shell 90 of the driven roller 44' desirably is fabricated from an electrically conductive material such as steel or brass. Again, the magnet 86 can be circumferentially polarized to form one or more sets of North and South poles equally spaced apart in at least that portion 92 of the magnet 86 which overlies the adjacent portion of the driven roller 44'. The amount of torque transmitted from the driving roller 46' to the driven roller 44' can be adjusted by varying the amount of overlappage between the magnet portion 92 and the adjacent end portion of the driven roller 44'. The resulting magnetic attraction between the tubular magnet 86 and the outer shell 90 is based upon slippage and eddy current induction, as described below. The roller mechanism 42' otherwise is actuated along with several such mechanisms maintained in an accumulation conveyor such as the conveyor of the preceding figures. The driving rollers such as roller 46' can be rotated as shown in FIGS. 1 and 1A or in FIG. 16.

As depicted in FIG. 3 with the use of the cylindrical or sleeve magnet 86, a proportionately wider guard 50' desirably is used. The depending flange 52' of the guard likewise prevents articles on driven rollers 44' from contacting the adjacent end 89 of the positively driven cylindrical magnet 86.

Figure 4:
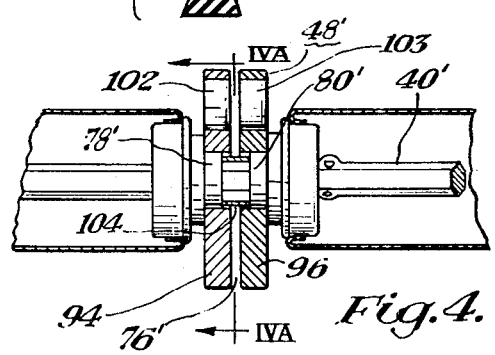
FIG. 4 is an enlarged partial cross-sectional view of a similar roller mechanism but utilizing a modified form of a magnetic torque transmitting mechanism.
Figure 4A:
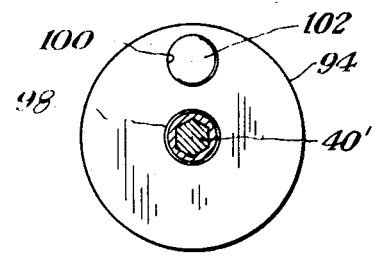
FIG. 4A is a cross-sectional view of the apparatus as shown in FIG. 4 and taken along reference line IVA—IVA.

In FIGS. 4 and 4A of the drawings, a torque-limiting transmission 48' similar to that shown in FIG. 2 is illustrated. In this example, however, the discoidal magnets 64, 66 are replaced with a pair of nonmagnetic discs 94, 96 fabricated from plastic or other suitable structural material. Each of the discs is provided with a central mounting aperture 98 and at least one eccentric aperture 100 (FIG. 4A). Into the aperture 100 of one of the discs 94 a slug 102 of magnetized material is inserted. A similar slug 102 of either magnetized material or unmagnetized magnetic material is pressed into the aperture 100 of the disc 96. To maintain the magnetic gap 76' therebetween, a spacing cylinder 104 is inserted between the opposing surfaces of the stationary inner bearing races 78', 80'. The torque-limiting transmission 48' and the associated components are urged together upon the axle 40' by suitable biasing means (not shown) such as the spring 84 of FIG. 2.

Figure 6:
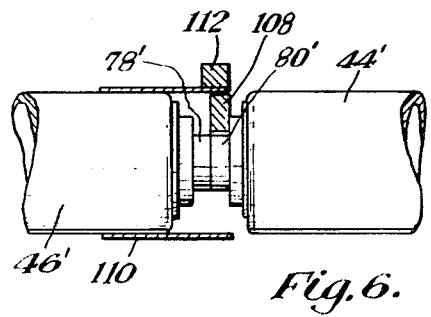
FIG. 6 is a similar view of still another form of torque transmitting means.
Figure 5:
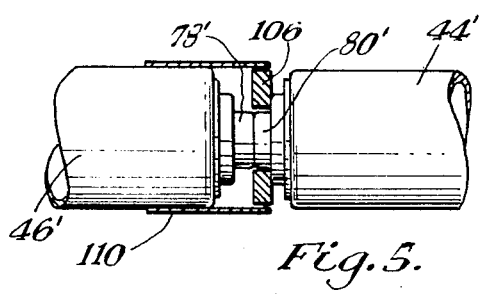
FIG. 5 is a partially sectioned otherwise similar view (relative to FIG. 4) and showing another form of torque transmitting means.

In FIGS. 5 and 6 of the drawings, a permanent magnet of selected contour, such as the annular magnet 106 (FIG. 5) or a slug magnet 112 (FIG. 6), is affixed to the adjacent outer bearing race of the driven roller section 44'. The magnet 106 or 108 cooperates with a sleeve 110 of magnetic material such as carbon steel affixed to the adjacent end of the drive roller 46' for rotation therewith. The magnetic attraction between the sleeve 110 and the magnet 106 or 108 can be enhanced by means of an additional slug or ring magnet such as the slug 112 affixed to the sleeve 110 in FIG. 6. In the latter Figure, the extent of magnetic attraction and transmitted torque between the sleeve 110 and the associated permanent magnet can be varied either by moving the magnetic slug 112 longitudinally of the sleeve 110 or by substituting a different size of magnet for the slug 112. In either of FIGS. 5 or 6, transmitted torque can be varied by inserting a washer or other spacer (not shown) between the inner bearing races 78', 80'. Alternatively, one or more slugs of unmagnetized magnetic material such as carbon steel can be employed in place of the magnetic slug 112 in FIG. 6 to concentrate lines of magnetic force for attraction between the sleeve 110 and the driven roller magnet 108.

Figure 7:
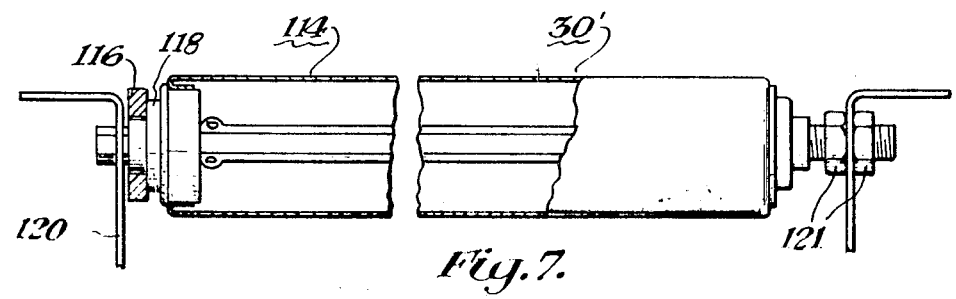
FIGS. 7 and 8 are sectional views of a roller construction, having associated therewith torque-limiting transmissions consisting of magnetic drag devices suitable for use in inclined or gravity conveyors.
Figure 8:
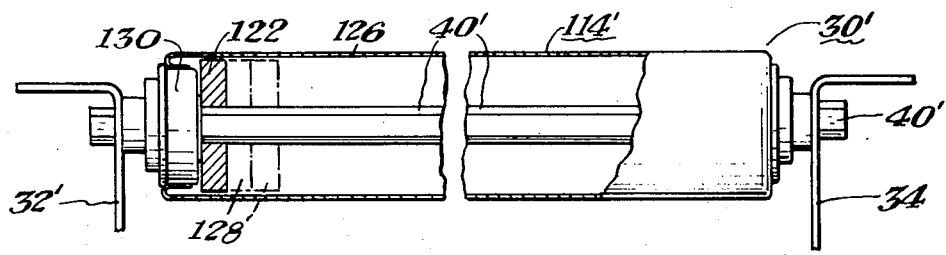

In FIGS. 7 and 8 of the drawings our limited torque conveyor 30' is arranged for use as an inclined or gravity conveyor and the torque-limiting transmissions thereof are arranged to impose a negative torque or drag upon driven rollers 114 which are unpowered. In FIG. 7 a permanent magnet 116 is secured to outer bearing race 118 for rotation with the roller 114. A drag is imposed upon the roller 114 by interaction of the rotating face-polarized magnet 116 with the adjacent conveyor rail 120, which is made from an electrically conductive material in which eddy currents are induced by the rotating magnet 116. The magnetic gap between the magnet 116 and the adjacent conveyor rail 120 can be adjusted by manipulating lock nuts 121 to move the entire driven roller 114 and drag magnet 116 toward or away from the rail 120. Similar gap-control means can be employed in the other magnetic transmissions disclosed herein.

As the magnetic attraction depends upon slippage between the magnet 116 and the conveyor rail 120 there are no restraining forces upon the rollers 114 until the latter are put into motion by the first article sent down the conveyor. That is to say, the starting inertia of the rollers 114, which must be overcome by the first article sent down the conveyor, is not increased. Subsequent articles, on the other hand, are prevented from attaining damaging speeds.

Figure 7A:
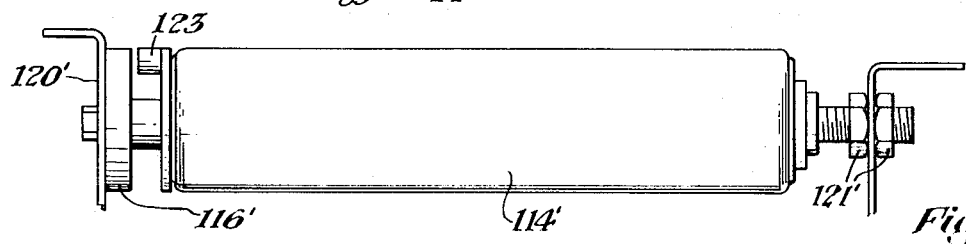
FIGS. 7A and 7B are similar views of modified drag transmissions.

Alternatively, a face polarized annular magnet 116' for each axle can be affixed to conveyor rail 120, as shown in FIG. 7A. Drag upon each roller is produced by one or more magnetizable slugs such as the slug 123 secured to an adjacent surface of each roller 114' for rotation therewith. Drag upon each roller 114' can result from magnetic attraction-repulsion forces or from frictional contact between the associated slug 123 and magnet 116', if the nuts 121' are so adjusted.

Figure 7B:
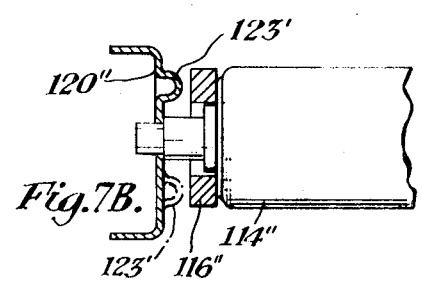

On the other hand the magnet 116" and the one or more slugs 123' can be positionally reversed as shown in FIG. 7B. In the latter case, the one or more slugs 123' are affixed to the conveyor support rail 120", as by stamping or pressing to extrude an adjacent portion of the rail material (where the rail is made from a magnetizable material).

Another drag arrangement is seen in FIG. 8 where a permanent magnet 122 is keyed to axle 40'. In the latter arrangement the magnet 122 is therefore stationary and desirably is positioned within the rotatable roller 114'. The magnet 122 is circumferentially polarized for interaction with shell 126 of the roller 114'. The shell 126 is fabricated from an electrically conductive material for the induction of eddy currents therein when the shell 126 is rotated relative to the stationary drag magnet 122.

In order to increase the drag forces, additional permanent magnets denoted by chain outlines 128 thereof can be keyingly positioned upon the axle 40'. The magnets 128 preferably are circumferentially polarized for interaction with the roller shell 126. The first-mentioned magnet 122 however can be either face-polarized for interaction with the outer bearing race 130 or circumferentially polarized for interaction with the roller shell 126.

Figure 9:
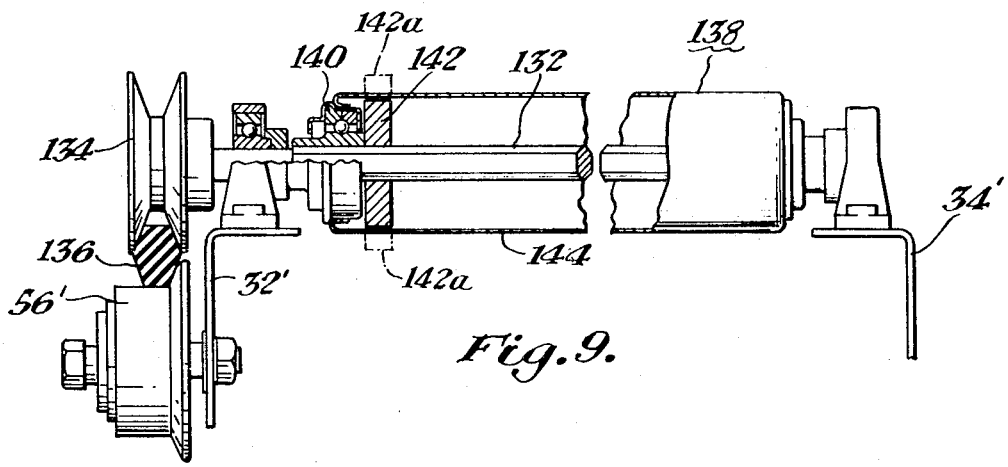
FIG. 9 is a cross-sectional view of a conveyor construction similar to that shown in FIGS. 1–6 but utilizing a torque-limiting transmission which obviates the driving rollers shown in these figures.

The conveyor construction of FIG. 9 is generally similar to the conveyor construction of FIGS. 1–6, with the exception that axles 132 are rotatably mounted on the conveyor siderails 32, 34. A sheave 134 is secured to the protruding end of each of the axles 132 for rotation therewith. The axles 132 and sheaves 134 are rotated by means of a double vee belt 136 supported by snub rollers 56'. A driven roller 138 is rotatably mounted upon each of the axles 132 by means of a pair of ball bearing assemblies one of which is denoted at 140.

Within each roller 138 is a discoidal permanent magnet 142 keyed to the associated axle 132 for rotation therewith. When each axle 132 is rotated rapidly by the sheave 134 and belt 136, the roller 138 is rotated by the torque transferred thereto by the magnetic attraction between the permanent magnet 124 and the electrically conductive shell 144 of the roller 138 as a result of eddy current induction. A very small torque will, of course, be transmitted to the roller 138 through its bearings 140 from the rotating axle 132. Alternatively, the FIG. 9 construction can be converted into a synchronous magnetic drive by securing one or more magnetizable slugs, such as the slugs 142a (shown in chain outline) to the roller shell 144. The slugs 142a during normal or nonaccumulated operation transfer torque synchronously from circumferentially polarized disc magnet 142. It is contemplated that a similar construction can be substituted for the other eddy current couplings shown herein.

Figure 9A:
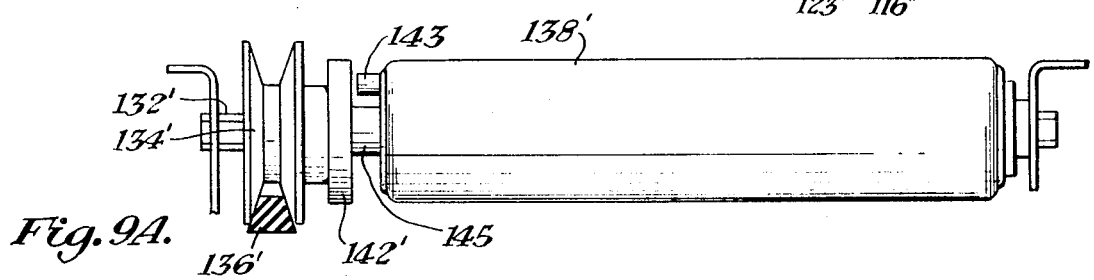
FIGS. 9A and 9B are similar views of modified transmission arrangements.
Figure 9B:
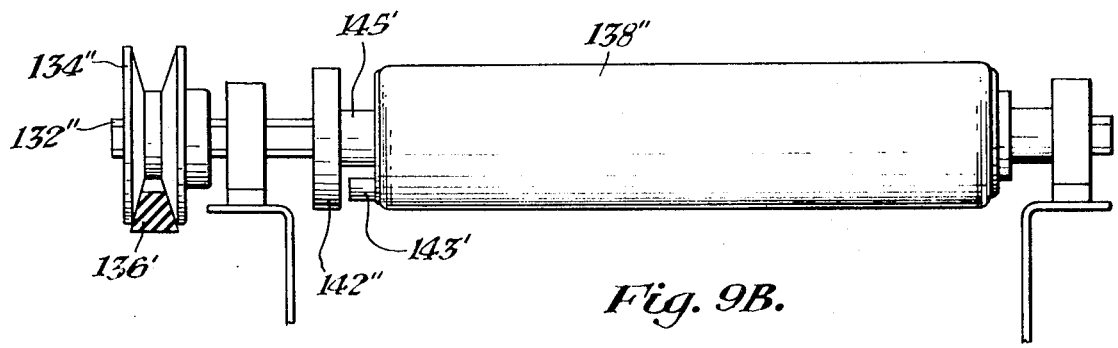

In FIG. 9A, a sheave 134' is mounted on shaft 132' adjacent the roller roller 138'. A face polarized disc magnet 142' is secured to the sheave 134' for rotation therewith. The shaft 132' can be fixed or rotatably mounted. In the latter case, the sheave 134' is secured to the shaft for rotation therewith. The driven roller 138' is rotatably mounted on the shaft 132' in any event. The magnet 142' cooperates with a slug 143 of magnetizable material, such as steel, to transfer limited torque from sheave 134' when driven by belt 136' to driven roller 138'. A sheave spacer 145 can be inserted between the magnet 142' and roller 138' to determine a magnetic gap between the magnet 142' and slug 143. Alternatively during torque transmission the slug 143 and magnet 142' can be held in limited frictional engagement by magnetic attraction therebetween.

Figure 10:
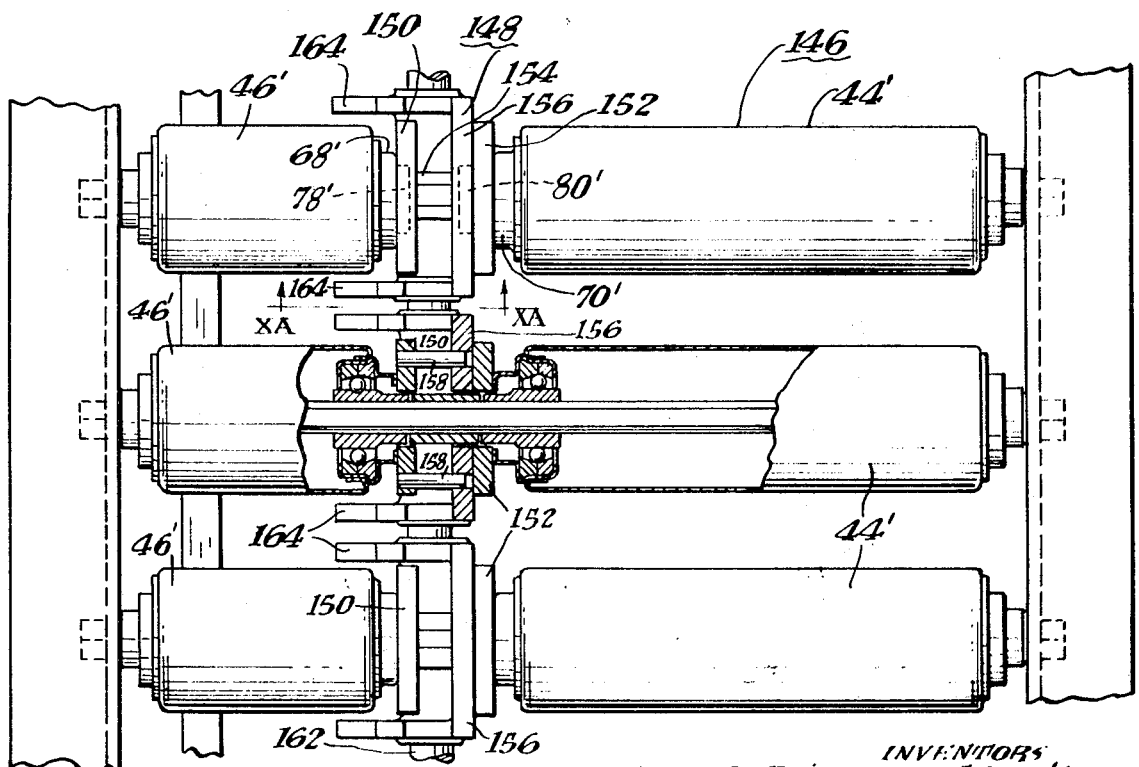
FIG. 10 is a partial top plan view partially sectioned of a conveyor construction similar to FIGS. 1–6 but employing one form of releasable torque-limiting transmission.
Figure 10B:
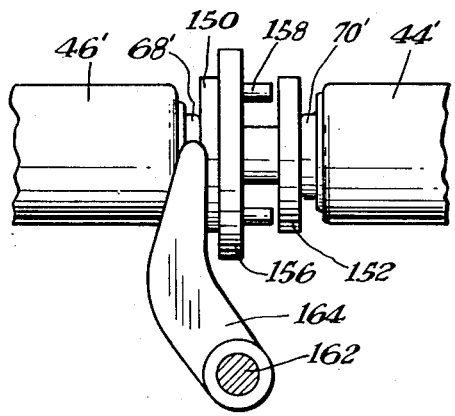
FIG. 10B is a similar view showing the decoupled position of the torque-limiting transmission.
Figure 10A:
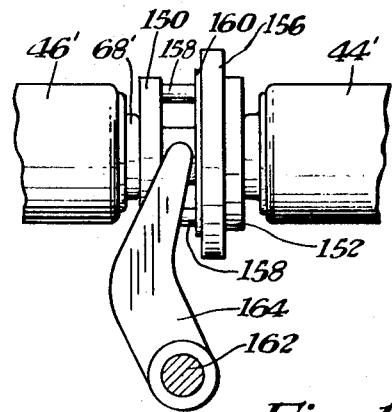
FIG. 10A is a partial cross-sectional view of the conveyor as shown in FIG. 10 and taken along reference line XA—XA thereof.

FIGS. 10, 10A and 10B illustrate another novel conveyor construction 146 having driven and driving rollers 44', 46' which are basically similar to the rollers described above in connection with FIGS. 1–6. Means are included, however, for automatically terminating the application of the limited torques by transmissions 148 to the driven rollers 44' when the latter are stopped by accumulated articles.

In this arrangement, of the torque-limiting conveyor 146, each transmission 148 comprises annular magnets 150, 152 secured respectively to the outer races 68', 70' of the driving roller 46' and the associated driven roller 44'. In this example the rollers 46', 44' and the magnets 150, 152 supported thereby are spaced axially from one another by sleeve 154 interposed between their inner bearing races 78', 80'. A central magnet 156 of the transmission 148 is slidably mounted in this intervening space between the magnets 150, 152 upon a number of pins 158 which can be secured to the driving roller magnet 150. In this example three pins 158 are used, although a different number obviously can be employed. The pins 158 terminate closely adjacent the driven roller magnet 152 so that the central magnet 156 can slide from a decoupled position adjacent the driving magnet 150 to a driving position adjacent the driven magnet 152 as shown in FIGS. 10A and 10B, with FIG. 10A representing the driving position of the central magnet 156.

The magnets 150, 152 desirably are face magnetized such that their poles are juxtaposable to the movable, central magnet 156. The latter magnet 156 on the other hand is similarly polarized with the poles thereof being juxtaposed in this example only to the driven magnet 152.

In the driving position of the transmission 148 (FIG. 10A) the central magnet 156 is at that time coupled to the driven magnet 152 with the usual orientation of unlike poles. When slippage occurs between the driven rollers 44' and the driving rollers 46', as when articles on the former are held up or accumulated, the resulting slippage between the central magnet 156 and the driven roller magnet 152 misorientates the pole alignment such that the movable central magnet is immediately repulsed to its decoupled position, as shown in FIG. 10B. This action decouples the torque-limiting mechanism 148 such that no force is transferred to the stopped driven rollers 44' and to the articles stopped thereon.

The magnetization at the right-hand face of the central magnet 156 usually does not extend through to the left-hand face, as viewed in the drawings. Therefore, when the central magnet is repulsed as aforesaid to decouple the transmission 148 the central magnet 156 is held against the drive roller magnet 150 by the magnetic forces associated with the substantially unmagnetized left-hand face of the central magnet 156. The aforementioned magnetic forces can be increased, if desired, by use of washer 160 fabricated from a material such as carbon steel.

When it is desired to restart the driven rollers 44' and the articles accumulated thereon, means are provided for simultaneously recoupling the torque-limiting transmissions 148. One form of such recoupling means includes a shaft 162 extending substantially along the length of the conveyor 146 and adjacent the torque-limiting mechanisms 148 as better shown in FIG. 10. One or more arms or cams 164 are mounted at each torque-limiting mechanism 148 and upon the shaft 162 for limited angular displacement therewith. In the example shown a pair of such arms 164 are mounted for movement generally in the path of each central magnet 156. With a slight angular displacement of the shaft 162 the arms 164 are similarly moved to engage the central magnets 156 of the mechanism 148 and to move the central magnets from their decoupled positions shown in FIG. 10B to their coupled or driving positions against the driven magnets 152, as shown in FIG. 10A. The mechanism 148 then can transmit limited torque to the driven rollers 44' until the latter are again stopped whereupon the central magnets 156 are decoupled by the resulting repulsional forces as described above.

Alternatively, in absence of the washer 160 the driving magnet 150 can be replaced with a disc or other suitably shaped member of ordinary structural material in each transmission 148. A relatively light compressed spring can be employed instead to maintain the separation of the central magnet 156 and the driven magnet 152 when they are repulsed upon disorientation of their poles.

Figure 11A:
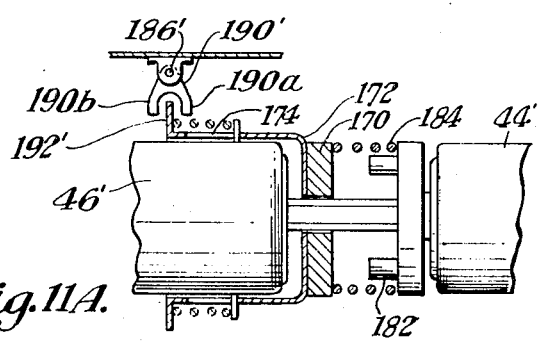
FIG. 11A is a similar view of our novel conveyor construction incorporating a clutch feature.
Figure 11:
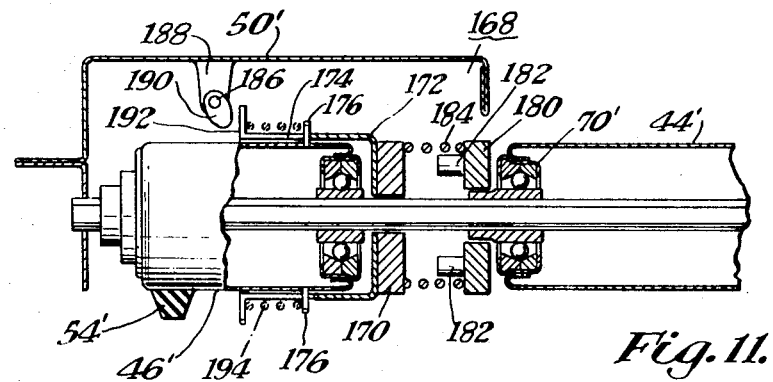
FIG. 11 is a view similar to that of FIG. 10B but illustrating a modified form of decoupling means therefor.

A somewhat similar transmission is shown in FIG. 11 where transmission 168 includes a single permanent magnet 170 supported on a cup-shaped member 172. The cup 172 is slidably mounted, by means of a pin and slot arrangement 174–176, upon the adjacent end of driving roller 46'. A driven assembly including driven roller 44' includes a disc 180 of plastic or other suitable structural material adhered to outer race 70' of the driven roller 44'. A plurality of slugs 182 of magnetic material (not necessarily magnetized) are mounted on that face on the annular disc 180 which is adjacent the movable magnet assembly 170–172.

The magnet 170 desirably is face magnetized such that at least one North and one South pole are formed on that face thereof juxtaposed to the slugs 182. The slugs 182 are preferably orientated with the poles of the movable magnet 170 to adhere the latter to the driven assembly 44', 180–182.

When slippage occurs between the driven roller 44' and the driving roller 46', and between the components of the transmission 168 secured respectively thereto, the slugs 182 and the poles of the magnet 170 become misorientated hereupon compressed biasing spring 184 separates the magnet 170 from the slugs 182 to decouple the transmission 168. When the accumulated articles on the conveyor are released, driving torque is again transitted to the driven rollers 44' by angularly displacing cam shaft 186 extending the length of the conveyor in which the assembly of FIG. 11 is employed. The cam shaft 186 can be rotatably mounted upon a series of depending supports 188 secured to the shield or guard 50'. A plurality of cam members such as the cam 190 are spaced and secured along the length of the cam shaft 186 for angular displacement therewith. The cam 190 cooperates with an out-turned flange 192 secured to the adjacent extremity of the slidably mounted cup 172 to return the cup and the magnet 170 secured thereto to a position of magnetically attracted engagement with the slugs 182 against the action of the biasing spring 184. A number of driving rollers such as the roller 46' in FIG. 11 can be driven from an endless belt 54' and the belt drive mechanism as described previously, including a plurality of snub rollers or the like (not shown).

Alternatively, the aforementioned spring 184 can be omitted and individual biasing springs (not shown) can surround each of the magnetic slugs 182 which are made cylindrical for this purpose. Alternatively, also, the biasing spring 184 can be replaced by a similar spring surrounding the cup member 172 and confined between its flange 192 and the mounting pins 176 as denoted by chain outline 194 of such spring.

Where the conveyor drive is frequently stopped and restarted, wear on an electric motor drive therefor can be minimized by further endowing the mechanism of FIG. 11 with a clutch feature as shown in FIG. 11A. The cams 190' are provided with a second cam lobe 190b. When the cam shaft 186' is rotated clockwise the cam lobes 190a engage flanges 192' to decouple all of the driven rollers 44'. This obviates the need for an oversized motor to withstand successive restarts. To recouple the driven rollers 44' the magnetic transmission is reengaged by rotating cam shaft 186' clockwise, after the manner set forth in FIG. 11.

Figure 12:
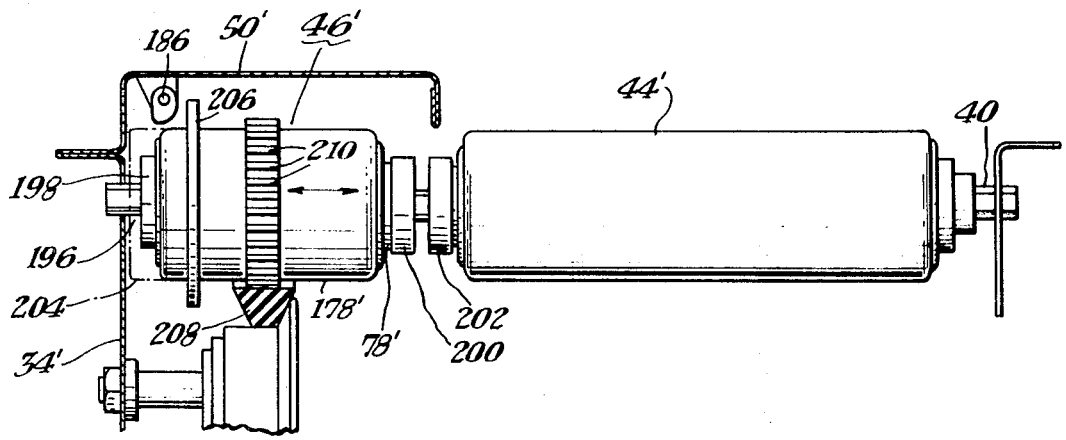
FIG. 12 is a similar view showing still another form of releasable torque-limiting transmission.

A similar transmission for a torque-limiting coupling between driver roller 44' and driving roller 46' is illustrated in FIG. 12. In this arrangement the entire driving roller 46' is slidably mounted for limited longitudinal movement along axle 40'. In furtherance of this purpose a space 196 is left between the conveyor side rail 34' and the adjacent inner race 198 which together with the other inner race 78' of the driving roller 46' is slidably but nonrotatably mounted on the axle 40'. A pair of annular magnets 200, 202 are mounted respectively on the adjacent outer races of the driving and driven rollers 46', 44' in the manner previously described. When the poles of the magnets 200, 202 become misorientated as when the driven rollers such as the roller 44' are stopped by accumulated articles, the driving rollers are displaced by the resulting repulsional forces to their chain outline position 204 to decouple the magnets 200, 202.

When normal rolling torque is to be reapplied to the driven rollers 44', a cam shaft 186 mounted for example on guard 50' as described above, is angularly displaced to reengage the magnets 200, 202 in cooperation with flange 206 mounted on shell 178' of the driving roller 46'. To prevent slippage as the driving rollers 46' are displaced axially a cog belt 208 can be substituted for the belt 54' described previously. The cog belt 208 can cooperate with a plurality of elongated teeth 210, secured to the circumferential surface of the driving roller, irrespective of the longitudinal position of the driving roller 46' on axle 40'.

In FIG. 13 of the drawings means are disclosed for providing a singulation feature in conjunction with our novel conveyor structure. One arrangement of such singulation means includes one or more sensing rollers such as roller assembly 211 mounted upon vertically movable axle 213 such that the assembly 211 normally extends a short distance above the pass line 212 of the conveyor. The mounting of sensing roller assembly 211 upon the conveyor side rails 32', 34' is spring loaded (not shown) such that the weight of an article 214 displaces the sensing roller assembly 211 to the normal pass line 212 of the conveyor. A pivoted linkage 216 with the fulcrum 218 thereof secured to the adjacent conveyor rail 32', 34' is secured to the axle 213 of the sensing roller assembly 211. A brake block 220 is mounted at the other end of the linkage 216 for vertical movement toward and away from a predetermined number of adjacent rollers, in this example three rollers, in order to stop the rotation of the same when the sensing roller 211 is depressed.

With this arrangement the weight of a preceding or downstream article 214 holds up a succeeding or upstream article 214a by stopping the rotation of these roller assemblies 42'a, which support the article 214a, until the downstream article 214 passes the sensing roller 211.

Where a number of articles such as the article 214a must be stopped, additional sensing rollers and additional linkages 222 can be employed to stop the line of articles at two or more points in the line.

In FIGS. 14 and 15 of the drawings another singulation arrangement is disclosed which can be utilized for either singulation or desingulation depending upon the direction of movement of articles on conveyor 224. In this arrangement a section 226 of the conveyor 224 is provided with a number of roller assemblies 42'b in which the driving roller 228, 230 and 232 are or increasing diameters from left to right as viewed in FIGS. 14 and 15. However, the driven rollers 44'b associated therewith are of the same diameter and thus the conventional pass line 212' is maintained. This arrangement presents the additional advantage that the conveyor rails 32', 34' can be drilled or punched in the usual manner to receive the axles 40' which are unchanged in both structure and in elevation along the length of the conveyor.

The differing diameter driving rollers 228–232 of course are rotated more slowly with increasing diameter through engagement with drive belt 54'. The driven rollers 44'b in the conveyor section 226 are likewise rotated more slowly when articles are moved in the direction of arrow 234. This provides a limited accumulation of articles upon the conveyor 224 when moved in the direction of arrow 234. However, when the articles are moved in the opposite direction, as denoted by arrow 236, the articles are spaced or singulated upon the conveyor as they pass the accelerating section 226.

While accumulation is essential in many production lines to provide surge capacity, it is frequently desirable to singulate the articles following their accumulation to facilitate subsequent handling thereof.

Figure 16:
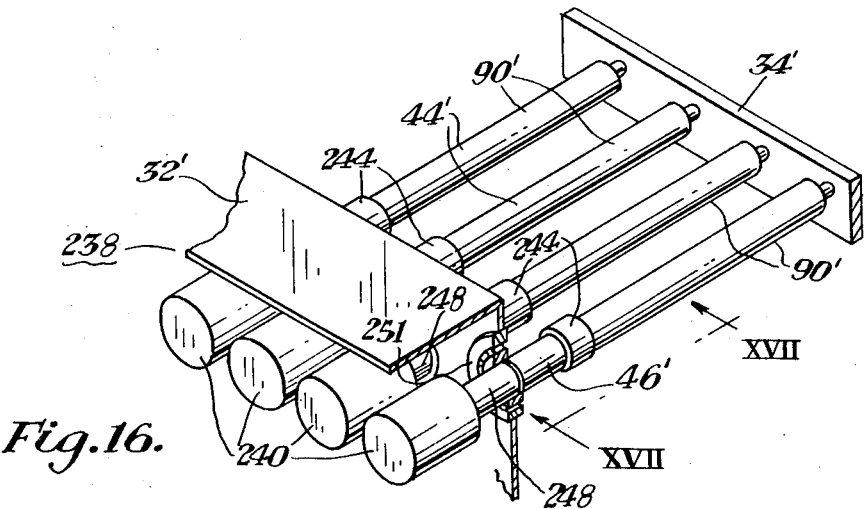
FIG. 16 is a partial isometric view of still another form of our novel conveyor construction having modified driving means and modified torque-limiting transmissions.

Referring now to FIGS. 16 and 17 of the drawings, another form of magnetically driven conveyor 238 is illustrated wherein an individual drive such as electric motors 240 are provided individually for the driving rollers 46'. As better shown in FIG. 17 each driving roller is provided with a permanent magnet 242 adhered or otherwise secured to its outer bearing race 68'.

The permanent magnet 242 is circumferentially polarized and cooperating therewith is a sleeve 244 of electrically conductive material such as aluminum. The sleeve 244 is secured to the adjacent end portion of shell 90' of driven roller 44'. A limited amount of torque is transferred from the driving magnet 242 to the driven sleeve 244 by means of the eddy currents induced in the sleeve 244 by the rotating magnet 242. The torque transmission designated generally as 246 depends upon a predetermined amount of slip between the relatively rotating components thereof, i.e., the magnet 242 affixed to the driving roller 46' and the sleeve 244 affixed to the driven roller 44', in order to transmit a predetermined amount of torque from the driving roller to the driven roller sufficient to overcome the loaded rolling friction of the driven roller 44'.

Associated with the eddy currents induced in the conductive sleeve 244 are magnetic fields which react with the magnetic flux of the rotating magnet 242 to produce a relatively slow rotation of the driven roller 44' from a relatively rapid rotation of the associated driving roller 46'. Thus, a relatively high rate of slip is required to transmit a torque of sufficient value as to be useful in turning the driven rollers 44' when loaded with moving articles.

The slip characteristic of the eddy current transmission 246 has the advantage of transmitting only a limited torque to the relatively slowly driven rollers 44', which can be stopped without unduly increasing the eddy current induction and the resultant forces applied to the articles accumulated thereon.

Another important consideration of the eddy current transmission is a speed reduction feature resulting from the aforementioned slippage characteristic. Thus relatively small and inexpensive drive mechanisms, such as the electric motors 240, can be direct-coupled respectively to the driving rollers 46' by means of tubular drive shafts 248 which in this example surround the adjacent protruding ends 249 of the stationary axles 40'. The tubular shafts 248 are secured directly to the associated driving rollers 46' to the adjacent outer bearing races 250 thereof, as better shown in FIG. 17. The tubular shafts 248 are supported by side rail 32' and bearings 251, which in turn support the adjacent ends of the roller assemblies 42'. The remote ends of the axles 40' in this example are held keyingly and nonrotatably in the other side rail 34'.

Desirably, the electric motors 240 are of the high-speed variety (for example 1,800 or 3,600 r.p.m.), and the slip characteristic of the transmission 246 is such that the driven rollers 46' are rotated at a speed of 100 r.p.m. or less. With these differential rotating speeds of the driving and driven rollers, it will be understood that the torque transmitted by the transmissions 246 is not appreciably increased when the driven rollers are stopped by accumulated articles resting thereon.

In addition to limiting the transmitted torque, the transmission 246 eliminates the necessity of expensive gear reduction units or the like between the individual drives 240 for the conveyor roller assemblies 42'. By eliminating gear reduction units and the power losses entailed thereby, an inexpensive, small, high-speed electric motor can be direct coupled to each of the roller assemblies 42'. Thus, a live roller conveyor such as the conveyor 238 can be arranged in compact form for conveying relatively small articles when required.

It will be understood that the principles involved in the construction of the conveyor 238 can also be applied to very large conveyors such as used in the steel industry and other heavy industries. Although the conveyor 238 functions admirably as an accumulation conveyor it can of course, as in the case of the previously described conveyor constructions, be employed wherever live roller conveyors are needed. It is contemplated in certain applications, that a rapidly moving belt, similar to the belt 54 described previously, and an appropriate drive mechanism can be substituted for the electric motors 240 in rotating the driving rollers 46' at the requisite speeds.

It is also contemplated that a magnetic hysteresis transmission can be substituted for any of the synchronous magnetic transmissions described previously. A typical hysteresis transmission of known construction transmits a constant torque independently of the slip speed or differential speeds of the driving and driven rollers.

Figure 18:
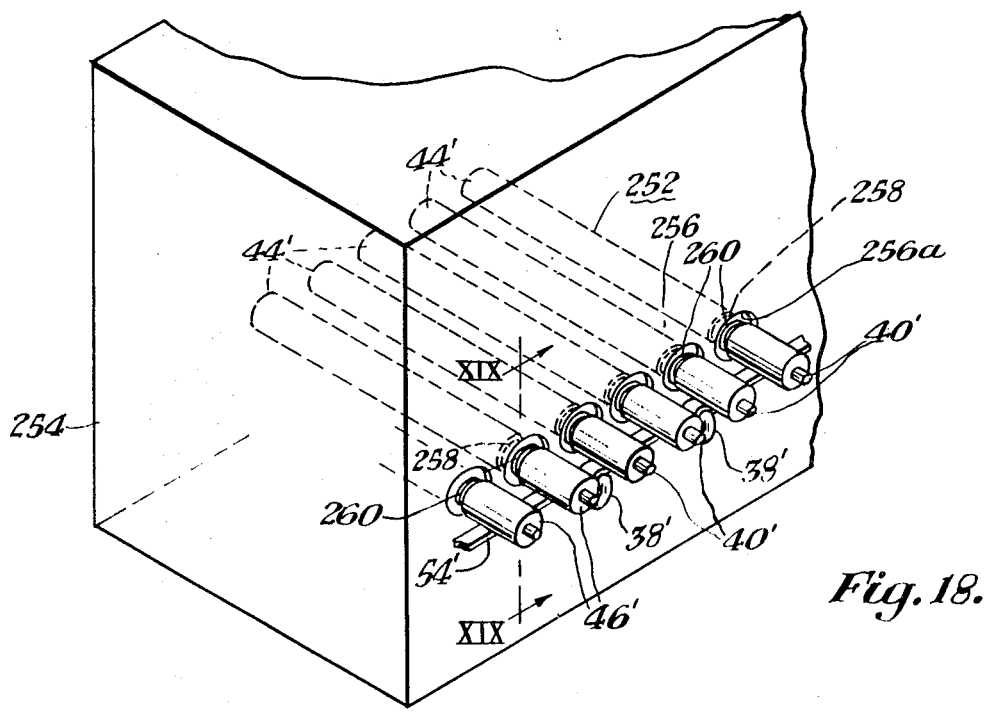
FIG. 18 is a partial isometric view of one form of our novel conveyor construction arranged for use in a sealed environment.
Figure 19:
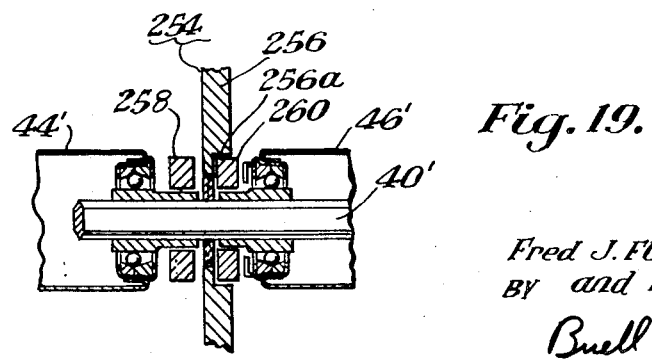
FIG. 19 is a partial, enlarged, vertically sectioned view of the apparatus as shown in FIG. 18, and taken along reference line XVIII—XVIII thereof.

In FIGS. 18 and 19 the use of our novel conveyor construction in a sealed or even a hermetically sealed environment is illustrated. In this arrangement, the roller conveyor 252 is associated with a sealed structure such as tank 254. The conveyor 252 is arranged such that its driving mechanism including the driving rollers 46', belt 54', snub rollers 38' and other moving components of the drive mechanism for the driven rollers 44' are located outside of the tank 254. This is an obviously advantageous arrangement where the tank 254 confines a corrosive atmosphere or other hazardous material. Moreover, the majority of the moving components of the conveyor 252 are always readily accessible for repair or maintenance.

The rollers 44', 46' are rotatably mounted upon stationary axles 40' which extend through the adjacent tank wall 256. As better shown in FIG. 19, the axles 40' are sealed at the points of their passage through the wall 256 as there is no relative movement between the axles 40' and the tank wall 256. These components can be reliably and even hermetically sealed in accordance with conventional sealing techniques when required.

A limited torque is transmitted from the rotating driving rollers 46' disposed outside of the tank 254 to the driven rollers 44' within the tank by pairs of disc magnets 258, 260 secured respectively to each pair of driving and driven rollers 44', 46'. The magnets 258, 260 are face-polarized so that two or more opposite poles are formed on the opposed faces of the magnets 258, 260. Thus, the driven magnets 258 and the driven rollers 44' to which they are secured are driven in synchronism with the driving rollers 46' by the magnetic attraction between the magnets 258, 260 across the magnetic gap defined by the tank wall 256. If the tank wall 256 is relatively thick it can be provided with a thinned portion 256a adjacent the rotating magnets 258, 260 as better shown in FIG. 19.

In view of the foregoing it will be apparent that novel and efficient forms of conveyor structures have been disclosed herein together with novel and efficient forms of torque-limiting transmissions therefor. While we have shown and described certain presently preferred embodiments of the invention and have illustrated presently preferred methods of practicing the same, it is to be distinctly understood that the invention is not limited thereto but may be variously embodied and practiced within the spirit and scope of the invention.

I claim:

1. A torque-limiting transmission for coupling adjacent members mounted for rotation relative to a common axle, a sleeve secured to one of said members for rotation therewith and spaced juxtaposed to an end portion of the other of said members, magnetic attraction means mounted on one of said sleeve and said end portion and positioned to attract the other of said sleeve and said end portion to transmit torque between said members, and means mounted on said axle for spacing said members one from the other.

2. The combination according to claim 1 wherein said magnetic means includes a pair of permanent magnets secured to said sleeve and to said end portion.

3. The combination according to claim 1 wherein said sleeve closely surrounds said end portion and a cylindrical magnet is mounted on said sleeve and polarized so as to induce eddy currents in said end portion.

4. The combination according to claim 1 wherein an annular magnet is secured to said portion and closely fitted within said sleeve, said annular magnet being circumferentially polarized to induce eddy currents in said sleeve, said sleeve being fabricated from an electrically conductive material.

5. A conveyor construction comprising a pair of elongated spaced supports and mounting means therefor, a plurality of spaced axles extending transversely between said supports and mounted thereon adjacent their ends respectively, a driven roller rotatably mounted on each of said axles, a torque-limiting transmission mounted adjacent each of said axles for applying a predetermined maximum torque to the associated one of said rollers, said transmission including a magnet mounted on each of said axles for rotation relative to the associated driven roller, and magnetic means on each of said rollers and juxtaposed to said magnets for limited magnetically attractive coupling between said magnets and said rollers respectively, and means coupled to said conveyor for varying the speed of the driven rollers relative to the remainder thereof in order to change the spacing between adjacent articles carried by the conveyor structure.

6. A conveyor as set forth in claim 5 wherein driving means are coupled to each of the torque-limiting transmissions for actuating the same.

7. A conveyor construction comprising a pair of elongated spaced supports and mounting means therefor, a plurality of spaced axles extending transversely between said supports and mounted thereon adjacent their ends respectively, a driven roller rotatably mounted on each of said axles, a torque-limiting transmission mounted adjacent each of said axles for applying a predetermined maximum torque to the associated one of said rollers, driving rollers rotatably mounted respectively on said axles adjacent said driven rollers for relative rotation with respect thereto, and said torque-limiting transmissions being coupled respectively between the driving and driven rollers of each axle, and means coupled to said conveyor for varying the speed of some of said driven rollers relative to the remainder thereof in order to change the spacing between adjacent articles carried by said conveyor structure, said speed-varying means including a section of said conveyor wherein the driving rollers of said section are provided with selectively increased diameters so that the driven rollers associated respectively therewith are rotated at selectively increased speeds such that the gaps between articles conveyed by said conveyor are opened or closed depending upon the direction of the movement of said articles relative to said section.

8. A conveyor construction comprising a pair of elongated spaced supports and mounting means therefor, a plurality of spaced axles extending transversely between the supports, adjacent first and second members rotatively mounted upon each of said axles and a torque-limiting transmission for coupling said first and second members and including a sleeve secured to one of the members for rotation therewith and spaced juxtaposed to an end portion of the other of said members, magnetic attraction means mounted on one of said sleeve and said end portion and positioned to attract the other of said sleeve and said end portion to transmit torque between said members, and means mounted on said axle for spacing said members one from the other.

9. A conveyor construction as set forth in claim 8 wherein one of said members is a driving roller and said other is a driven roller.

10. The combination according to claim 8 wherein said magnetic means includes a pair of permanent magnets secured to said sleeve and to said end portion.

11. A combination as set forth in claim 8 wherein said conveyor is an accumulation conveyor, and means are provided for stopping a number of articles supported thereon and engaging at least some of said members, said transmissions limiting the total force exerted by said same members upon said articles.